3,200,532
LIVE FISHBAIT HOLDER
Sylvan Brooks Walton, 21050 Saratoga Hills Road,
Saratoga, Calif.
Filed Mar. 28, 1963, Ser. No. 268,750
3 Claims. (Cl. 43—44.6)

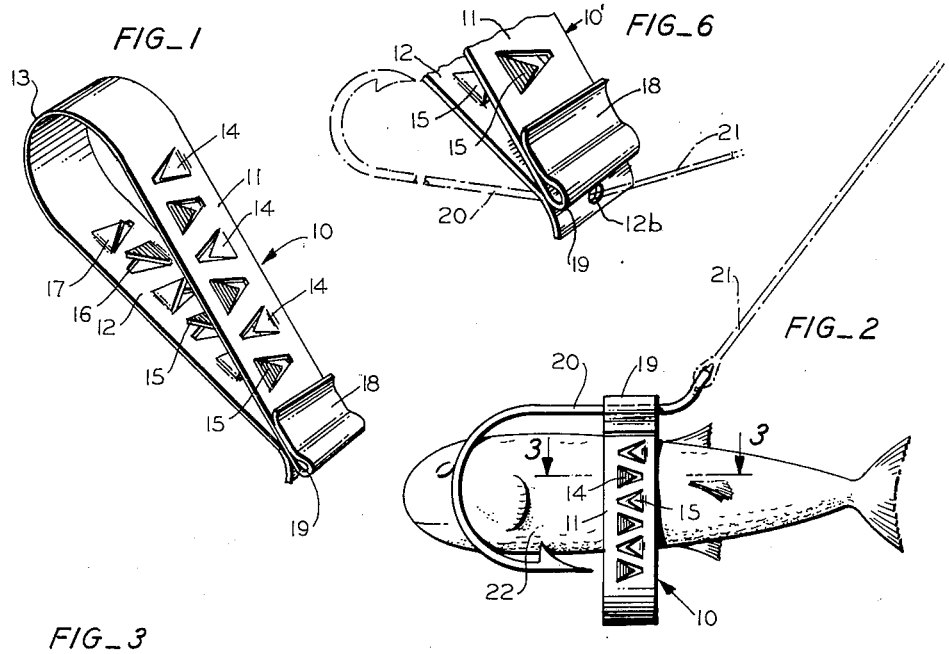

This invention relates to a live fish bait holding device adapted to be used in conjunction with a conventional fishing hook.

An object of this invention is to provide an improved fish bait holding device which is in the nature of a band adapted to grip the live fish bait, said device being adapted for attachment to a conventional fishing hook.

Still another object of this invention is to provide an improved live fish bait holding device constructed out of a thin metallic spring band having oppositely directed struck-out teeth for lightly gripping the fish bait and arranged so that it may be attached to a conventional fishhook.

Still another object of this invention is to provide an improved bait holder which may be used with a conventional fishing hook and in which the live fish bait is held adjacent to the fishing hook in such a way that the live fish bait may swim around in the water during the fishing operation.

Other and further objects of this invention will be apparent to those skilled in the art to which it relates from the following specification, claims and drawing:

Referring to the drawing briefly:

FIG. 1 is a perspective view of the fish bait holding device of this invention;

FIG. 2 is a side view showing this fish bait holding device attached to a conventional fishhook and having a live fish positioned therein;

FIG. 3 is a sectional view of the fish bait holding device taken along the line 3—3 of FIG. 2;

FIG. 4 is a side view of a modified form of this fish bait holding device shown attached to a conventional fishing hook and having a live fish held therein;

FIG. 5 is a sectional view taken along the line 5—5 of FIG. 4; and

FIG. 6 is a fragmentary view of another modification.

In the drawing reference numeral 10 designates the fish bait holding device made of thin metallic spring band material. This device comprises the side portions 11 and 12 each of which is provided with oppositely directed struck-out teeth for highly gripping the fish so that the teeth do not penetrate the fish and also so that the fish may swim carrying the lightweight band. Thus the side 11 is provided with a plurality of teeth 14 which face in one direction and project inwardly as shown in the sectional view FIG. 3. Opposing the row of struck-out portions 14 is another row of similar struck-out portions 15. These rows of opposing struck-out portions are both of toothlike configuration. The side 12 is also provided with opposing rows of teeth designated by reference numerals 16 and 17 which are similar to those provided to side 11.

Sides 11 and 12 are joined by the springy or resilient loop portion 13 which is not provided with any struck-out portions and this part of the device is adapted to arch around the bottom of the live fish bait when the device is applied thereto as shown in FIG. 2. The opposing teeth 14–15 and 16–17 engage the sides of the fish bait rather lightly to prevent the pointed parts of these teeth from penetrating the sides thereof. However, they engage the sides of the fish bait with sufficient pressure so that it is prevented from purging itself of the device by sliding out from between the sides 11 and 12 once the device is properly applied thereto.

The fishhook 20 is inserted into the loop 19 and held therein by the part 18 which is bent back over the side 11. Thus the device may be slipped over the fishhook by raising the part 18 up slightly and inserting the hook into the loop part 19. With the hook thus inserted into the device the loop portion of the fishhook and the pointed end thereof are carried alongside of the fish bait while the bait is swimming around in the water during the fishing operation. Thus the looped part 19 of the device preferably engages the hook 20 with sufficient pressure so that movement of the bait in the water will not cause slipping of the device along the hook 20.

In FIGS. 4 and 5 a modified form of this device is illustrated in which there is provided a hook-receiving-clamping-portion 23 that is formed in the bent part 13a which corresponds substantially to the bent part of the device shown in FIG. 1. Thus the hook 20 is clamped in the bent part 23 and the device and bait held on a predetermined part of the hook as shown in FIG. 4. This modified form of this invention is also provided with inwardly struck rows of teeth and these are formed in the sides 11a and 12a so that they lightly engage the live fish bait and hold it with sufficient pressure to keep it from slipping out from between the sides 11a and 12a.

In FIG. 6 there is shown a modified way of attaching the bait gripping device 10' to the fish hook and line. In this case the line 21 extends through the hole 12b provided in the end portion of part 12.

While I have shown a preferred embodiment of the invention, it will be understood that the invention is capable of variation and modification from the form shown so that its scope should be limited only by the scope of the claims appended hereto.

What I claim is:
1. In a live fish bait holder the combination comprising a resilient member bent upon itself to provide opposing side portions between which the live fish bait is positioned, at least one of said side portions of said member having oppositely oriented teeth which engage said fish bait and which exert only slight pressure on the sides of the fish bait so that the fish bait can swim, said teeth being oppositely oriented and being pointed in the direction of the length of said fish bait to prevent said fish bait from purging itself of said member, and means for attaching said member to a fish hook, said attaching means holding said fish hook adjacent to said fish bait.

2. In a live fish bait holder the combination comprising a resilient band bent upon itself to provide opposing side portions between which the live fish bait is positioned and which exert only slight pressure on the sides of the fish bait so that the fish bait can swim, at least one of said side portions of said band having oppositely oriented teeth struck therefrom extending transversely of said band, said teeth engaging said fish bait with said slight pressure, said teeth being pointed in the directon of the length of said fish bait to prevent said fish bait from purging itself of said band, and means for attaching said band to a fish hook, said attaching means holding said fish hook adjacent to said fish bait.

3. A live fish bait holder consisting of a resilient band bent upon itself to provide oppositely disposed side portions between which the live fish bait is positioned and which exert only slight pressure on the sides of the fish bait so that the fish bait can swim, said side portions of said band each having oppositely oriented teeth formed by struck-out portions of said band extending transversely of said band, said teeth engaging the sides of the fish bait, said teeth being pointed in the direction of the length of said fish bait to prevent it purging itself of said band, and said band including a formed portion providing a resilient socket to receive a fish hook.

(References on following page)

References Cited by the Examiner

UNITED STATES PATENTS

| | | | |
|---|---|---|---|
| 608,348 | 8/98 | Stadel | 43—44.6 |
| 1,745,169 | 1/30 | Johnson | 43—44.6 |
| 2,115,493 | 4/38 | Kosten | 43—44.8 |
| 2,273,582 | 2/42 | Maire | 43—44.8 |
| 2,319,246 | 5/43 | Martin | 43—44.6 |
| 2,564,216 | 8/51 | Stark | 43—44.8 |
| 2,588,526 | 3/52 | Hoage | 43—44.6 |
| 2,775,058 | 12/56 | Roberts | 43—44.4 |

FOREIGN PATENTS

| | | |
|---|---|---|
| 490,356 | 2/53 | Canada. |
| 23,132 | 1894 | Great Britain. |

SAMUEL KOREN, *Primary Examiner.*